June 3, 1924.
D. F. YOUNGBLOOD
AUTOMATIC DIFFERENTIAL GAUGE
Filed April 3, 1923
1,496,143
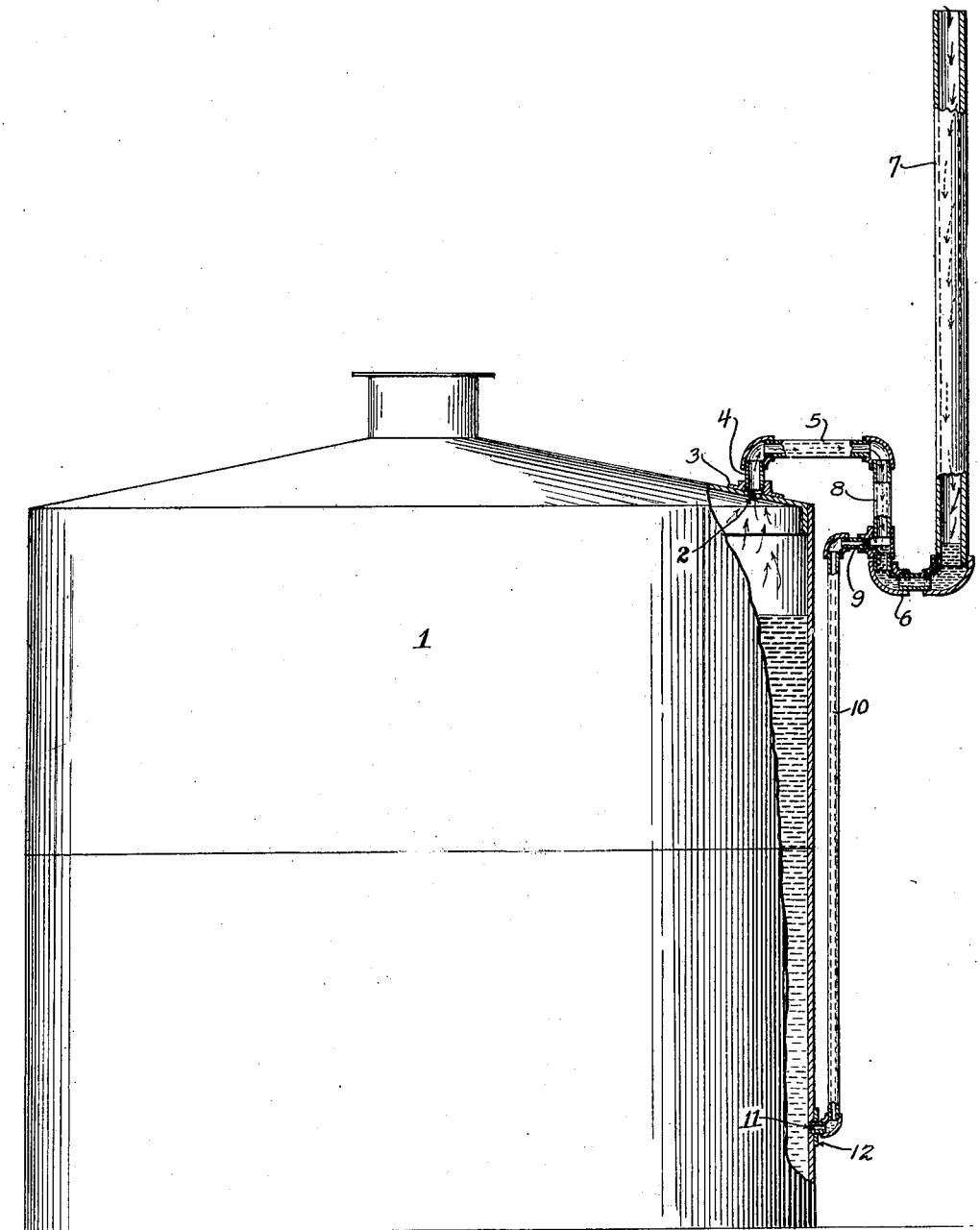
WITNESSES
INVENTOR
DAVID F. YOUNGBLOOD
BY
ATTORNEY Patented June 3, 1924.

1,496,143

UNITED STATES PATENT OFFICE.

DAVID FRANKLIN YOUNGBLOOD, OF SAN ANTONIO, TEXAS.

AUTOMATIC DIFFERENTIAL GAUGE.

Application filed April 3, 1923. Serial No. 629,653.

*To all whom it may concern:*

Be it known that I, DAVID F. YOUNGBLOOD, a citizen of the United States, residing at San Antonio, in the county of Bexar and State of Texas, have invented new and useful Improvements in Automatic Differential Gauges, of which the following is a specification.

This invention relates to an automatic differential gauge which is adapted to be connected with a receptacle containing liquid, and is especially useful in connection with tanks which are used for receiving and storing petroleum or derivatives of petroleum, such as gasoline, kerosene, distillate or other volatile liquid.

The present invention is in the nature of an improvement on the construction shown in the application Serial No. 627,192, filed March 23, 1923, and of which I am the assignee of one-half interest.

The object of the present invention is to simplify the structure shown in the aforesaid application, whereby the same may be made by a plumber from the fittings usually carried in stock, and may be applied to the tank with a minimum amount of labor and with no alteration in the tank structure except the provision of two openings in the walls thereof, one in or near the top wall providing the main vent, and a smaller opening near the bottom providing for the automatic regulator and gauge.

The invention will be best understood from the following description considered in connection with the accompanying drawing which illustrates the invention in its preferred form.

The single figure of the drawing represents a tank in side elevation with my invention installed thereon, a portion of the tank and of the attachment being shown in section.

In attaching the invention to the tank 1, the latter is provided in or near its top wall with a vent 2, surrounded by a reinforcing collar 3 into which is threaded a nipple 4 forming the extremity of a pipe section 5, the latter being in the form of a return bend and constituting a continuation of one leg 8 of the U-shaped pipe 6, within which is formed a liquid seal. The other leg of the U-shaped section is prolonged in an upward direction, as shown at 7, to receive the overflow from the liquid seal which is produced by pressure from the tank.

The leg 8, at a suitable distance above the bottom of the U-shaped portion 6, is provided with a small bleed hole 9 which is connected by a small duct 10 to an opening 11 near the bottom of the tank, which is preferably surrounded by a reinforcing collar 12.

Whenever the pressure of the gas or volatilized liquid within the tank 1 increases, the pressure thereof is transmitted through the pipe 5 and leg 8, and when a predetermined limit is reached, the liquid in the seal is forced out of the leg 8 and upwardly into the extension 7, and the gas is allowed to escape through the liquid to the atmosphere and thus reduce the internal pressure which would otherwise cause injury to the tank. Whenever oil is pumped out of the tank, thus tending to create a vacuum, the pressure of the atmosphere entering through the pipe extension 7 will cause a pressure on the liquid seal in the opposite direction until the liquid is forced into the leg 8, and the air is permitted to enter therethrough into the tank and relieve the vacuum condition.

It will be understood that the tube 10 provides a restricted means of communication between the leg 8 and the bottom portion of the tank, and any excess of liquid which is initially poured into the U-shaped portion 6 will eventually be discharged through the tube 10 into the tank. Liquid may also be discharged from the tank through the tube 10 to fill the liquid seal whenever the level within the tank reaches a predetermined point. Thus, after the device is once installed, it works automatically and requires no further attention. The tube 10 provides, therefore, a compensating device through which to gauge the amount of pressure or vacuum which may be reached before relief is obtained. The liquid seal will always operate to prevent any communication between the interior of the tank and the outside atmosphere as long as it is safe to do so, but whenever the pressure or vacuum is sufficient to threaten injury to the tank, it will be relieved as explained above.

While I have shown and described one specific construction by means of which the invention may be carried out, it will be understood that this is merely illustrative, and that modifications may be made in the form and size of the pipes and their specific arrangement, without departing from the scope of the invention as claimed.

What is claimed is:—

1. The combination with a receptacle for liquids, of a pipe outside the receptacle in communication with the interior of the receptacle above the normal liquid level therein and having a portion forming a liquid seal, and means for automatically filling the seal when the liquid within the receptacle reaches a predetermined level.

2. A liquid seal for receptacles containing liquids, comprising means for attachment outside the receptacle and responsive to a predetermined excess of pressure inside the receptacle to permit the escape of gas therefrom and responsive to a deficiency in pressure of a like amount to admit air to the receptacle, and means for automatically introducing liquid from the receptacle to form the seal when the liquid within the receptacle reaches a predetermined level.

3. The combination with a receptacle for liquids having top, bottom and side walls, of a pipe having a substantially U-shaped portion adapted to form a liquid seal and having one leg in communication with the interior of the receptacle above the normal liquid level therein, and a comparatively small tube providing communication between one leg of the U, and the interior of the receptacle near its bottom.

4. The combination with a receptacle for liquids having top, bottom and side walls, of a substantially U-shaped pipe adapted to form a liquid seal and having one leg thereof extended to form a return bend which is in communication with the interior of the receptacle above the normal level of the liquid within the receptacle, and a comparatively small tube providing communication between one leg of the pipe and the interior of the receptacle below its normal liquid level.

5. A liquid seal for receptacles containing liquids, comprising a pipe having a U-shaped section adapted to form a liquid seal and having one of its legs extended to form a return bend adapted to be connected with the top of the receptacle, the other leg being prolonged upwardly to retain the liquid from the seal when the pressure inside the receptacle increases, and means for relieving said pressure when a predetermined limit has been reached in order to prevent injury to the receptacle.

In testimony that I claim the foregoing as my own, I have hereto affixed my signature.

DAVID FRANKLIN YOUNGBLOOD.